Nov. 9, 1943.  F. F. LEWIS  2,334,106
AUTOMATIC WEIGHING AND TESTING MACHINE
Filed Dec. 26, 1941  2 Sheets-Sheet 1

Frederick F. Lewis.
INVENTOR
BY Victor J. Evans & Co.
ATTORNEYS

Nov. 9, 1943.    F. F. LEWIS    2,334,106
AUTOMATIC WEIGHING AND TESTING MACHINE
Filed Dec. 26, 1941    2 Sheets-Sheet 2
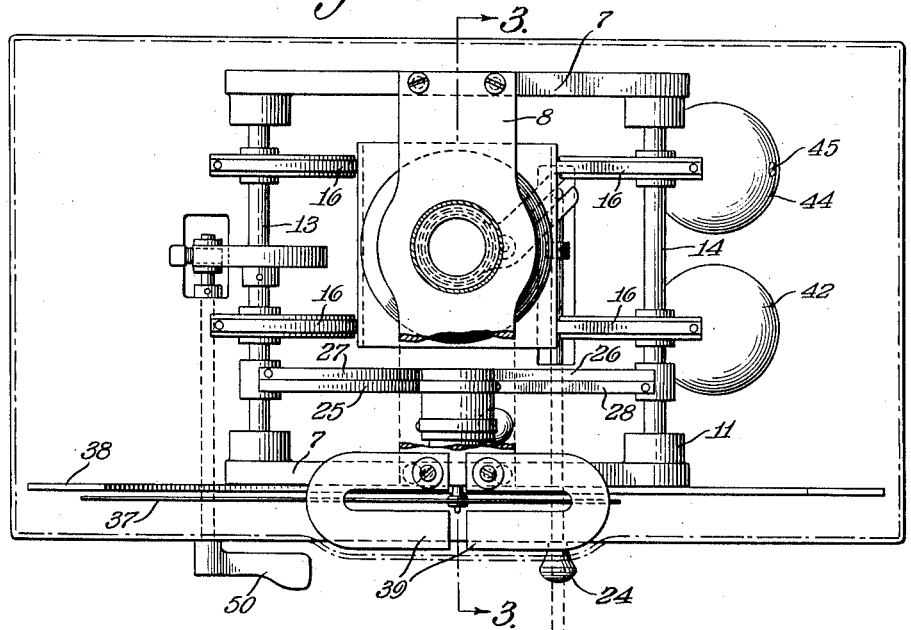
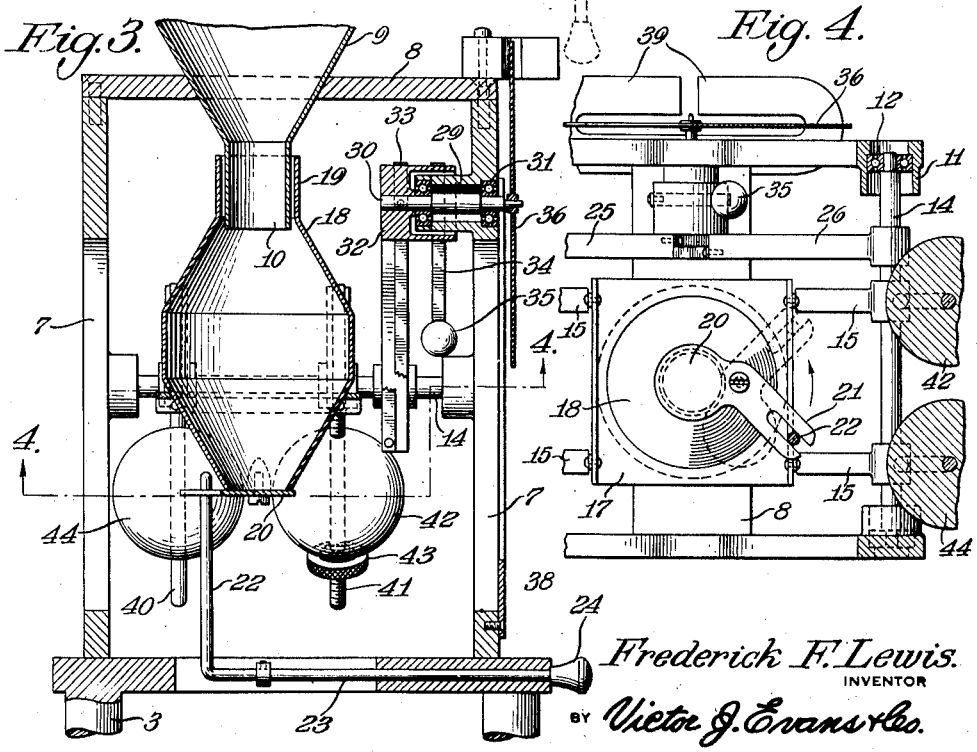
Frederick F. Lewis.
INVENTOR
BY Victor J. Evans & Co.
ATTORNEYS Patented Nov. 9, 1943

2,334,106

UNITED STATES PATENT OFFICE 2,334,106

AUTOMATIC WEIGHING AND TESTING MACHINE

Frederick F. Lewis, Brady, Mont.

Application December 26, 1941, Serial No. 424,517

7 Claims. (Cl. 265—27)

This invention relates to weighing machines, and its general object is to provide an automatic weighing machine primarily designed for testing the quality of grain, seed and like granular material by weight per bushel, while the material is under a constant flow, that is as it passes through the machine, thus it will be seen that my machine not only materially expedites the testing process, but such is accomplished with much greater accuracy than is possible by apparatus now in general use.

A further object is to provide a weighing machine for testing granular material, that is simple in construction, inexpensive to manufacture and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 2 is a sectional view taken approximately on line 2—2 of Figure 1, looking in the direction of the arrows.

Figure 3 is a sectional view taken approximately on line 3—3 of Figure 2, looking in the direction of the arrows.

Figure 4 is a sectional view taken approximately on line 4—4 of Figure 3, looking in the direction of the arrows.

Figure 1:
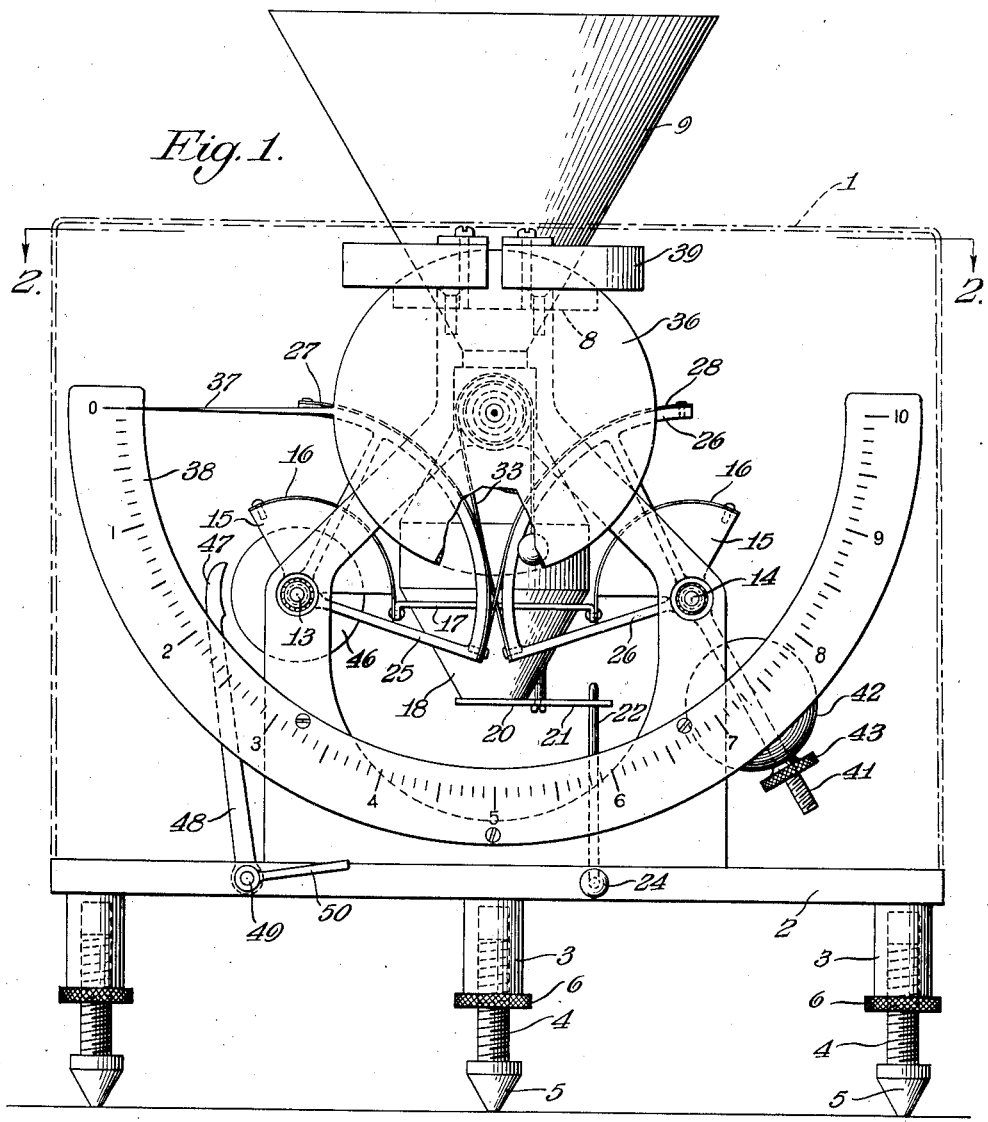
Figure 1 is a side elevation of the machine which forms the subject matter of the present invention, and illustrates the case for housing the same, in dotted lines.

Referring to the drawings in detail, the reference numeral 1 indicates a case for housing the movable parts of my machine and the case is of rectangular formation, having an open bottom, for the lower edge thereof to rest upon the base 2. Formed on or otherwise secured to the base 2 and depending therefrom are sleeves 3 of leveling means, the sleeves being interiorly threaded for receiving the threaded shanks 4 of substantially conical shaped feet 5, and the shanks have threaded thereon serrated lock nuts 6 for holding the leveling means in adjusted position, as will be apparent.

Secured to the base and rising therefrom are the side members 7 of a supporting frame, the side members being of open frame construction, as best shown in Figure 1, so as to reduce the weight of the machine to a minimum and secured to the top of the narrow upper portions of the side members is a relatively narrow cross member 8 providing the top of the frame. The cross or top member 8 is increased in width substantially centrally of its ends and the wide portion has a circular opening therein providing a beveled seat for the conical body portion of a funnel shaped hopper 9 that includes a cylindrical outlet spout 10.

Formed on or otherwise secured to the side members and extending inwardly therefrom are pairs of aligned collar housings 11 having mounted therein bearing elements 12 within which are mounted the reduced outer ends of a pair of parallel shafts 13 and 14, for free rotation, as will be apparent upon inspection of Figure 4.

Each of the shafts have fixed thereto the apex ends of a pair of relatively small solid quadrants 15 that are normally disposed above the shafts and directed at an inclination substantially toward each other, as best shown in Figure 1, having one of the ends of flexible metallic straps 16 secured to the outer ends thereof and following the shape of their arcuate portions to bear against the latter. The straps 16 are of a length to extend slightly beyond the opposite ends of the arcuate portions and are riveted or otherwise secured to downturned flanges formed on a platform like supporting member 17 having a circular opening therein for the major portion of its area, as best shown in Figure 4.

Mounted in the circular opening of the member 17 to be supported thereby is the lower conical portion of a container 18 which likewise includes an upper conical portion and a cylindrical portion between the upper and lower conical portions. Formed on and rising from the upper conical portion of the container 18 is a collar 19 within which is mounted the outlet spout 10 of the hopper 9, and the collar 19 is of a length and diameter to be spaced a considerable distance from the spout 10, as clearly shown in Figure 3, so as to allow free vertical movement of the container, without contacting the spout. The lower end of the container is open to provide an outlet and the outlet opening is of exactly the same diameter as that of the spout 10, for a purpose which will be later apparent.

The outlet opening of the container is provided with a closure that includes a disk shaped portion 20 of a diameter to close the opening, and formed on the portion 20 is a flat arm 21 pivotally secured to the container for movement of the closure to open and closed positions, as shown in full and dotted lines in Figure 4. The outer end of the arm is bifurcated and has mounted therein the upper end of an upturned portion 22 of a handle 23 which is in the form of a rod and is mounted for sliding movement in a bore within the base 2 that opens through the front side of the base and in a slot extending transversely of the base, as best shown in Figure 3, the handle having a knob 24 on its outer end and its inner end portion is mounted in a guide collar secured to one wall of the slot. By that construction, it will be obvious that the closure is moved to open and closed positions merely by pulling and pushing the handle through the medium of the knob, as shown by the full and dotted lines of Figure 2.

Fixed to the shafts 13 and 14 is a pair of relatively large frame like quadrants 25 and 26 that extend toward each other and have the lower ends of their arcuate portions arranged in close proximity. Connected to the upper ends of the arcuate portions of the quadrants 25 and 26 are one of the ends of flexible metallic straps 27 and 28, and the opposite end of the strap 27 is connected to the lower end of the arcuate portion of the quadrant 26, while the opposite end of the strap 28 is connected to the lower end of the arcuate portion of the quadrant 25, so that they will move in unison, as will be apparent upon inspection of Figure 1.

Formed on and extending inwardly from the front side member 7 is a sleeve housing 29 for a stub shaft 30, the latter being mounted in bearing elements 31 at the ends of the sleeve housing and of a length to extend through the same, as shown in Figure 3. Fixed to the inner end of the stub shaft 30 is a hub like member 32 formed with an annular flange that is disposed in surrounding relation to the sleeve housing 29 and connected to the hub like member 32 is one end of a flexible metallic strap 33 that has its opposite end connected to the lower end of the arcuate portion of the quadrant 25, as best shown in Figure 1, so that upon movement of the quadrant 25, the stub shaft 30 will be moved accordingly and of course in an oscillatory manner. Counterbalancing means is provided for the hub like member 32 and that means in the form shown includes a flexible metallic strap 34 which like the strap 33 is connected to the hub like member for disposal about the upper portion thereof, and fixed to the lower end of the strap 34 is a ball weight 35.

The outer end of the stub shaft is reduced and fixed thereto is a disk 36 having a pointer 37 formed on or otherwise secured to the periphery thereof to normally extend laterally therefrom and of a length to cooperate with the graduations on a substantially semi-circular dial 39 that is secured to the lower portion of the front face of the front side member 7, with its inner edge uppermost, as best shown in Figure 1.

In order to eliminate quivering of the pointer relative to the dial, I provide damping means therefor, and the means shown is made up of a pair of permanent or horseshoe magnets 39 fixed to the top frame member 8 with their poles directed toward each other, but spaced, so as to attract the disk 36 that has its periphery centrally arranged between the poles, as clearly shown in Figure 3.

Counterbalancing means is likewise provided for the container 18 and of course the contents thereof and that counterbalancing means includes a pair of arms 40 and 41 fixed to and extending at right angles from the shaft 14 for disposal in spaced parallel relation with respect to each other. The arm 41 is threaded throughout its length and has threadedly mounted thereon a ball weight 42 so as to provide a fine adjustment therefor, and the ball weight 42 is fixed in adjusted position by a lock nut 43. The arm 40 has a ball weight 44 slidably mounted thereon and held in adjusted positions by a set screw 45.

I also provide braking means for my machine and that means in the form shown includes a disk 46 fixed to the shaft 13 preferably between the quadrants 15 thereon, as best shown in Figure 2, for disposal in the path of the arcuate upper end 47 of a lever 48 that has its lower end secured to a rod 49 mounted for rocking movement in a bore in the base 2, the inner end of the rod 49 extending into a slot in the base, while its opposite end extends outwardly beyond the outer side of the base and has secured thereto a handle 50, with the result it will be seen that the knob 24 and handle 50 are conveniently arranged for use, as clearly shown in Figure 2.

From the above description and the disclosure in the drawings, it is believed that the operation of my machine will be obvious, but it might be mentioned that the closure for the outlet end of the container is initially moved to closed position and retained accordingly until the container becomes filled with material flowing therein from the hopper 9. The closure is then moved to open position, and as the outlet spout 10 is of the same diameter as the outlet end of the container 18, it will be seen that the container will be constantly loaded to full capacity, while the material is flowing therethrough, consequently the weight of the grain as it passes through the container will be indicated on the dial 38 by the pointer 37, so that any variance in the quality of the material as it passes through the container can be readily ascertained, due to the variance in the weight thereof. The graduations represent pounds, so that the machine is primarily designed for testing the material by weight per bushel and in the event the material should vary to the extent of one-tenth of a pound per bushel, such will be indicated by my machine, due to the accuracy thereof, as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A machine for testing the weight of granular material under constant flow, comprising a container having an outlet, material receiving means having an outlet associated with the container for introducing the material therein for passage therethrough, means for closing the container outlet to bring about initial filling of the container, said outlets being of the same size to retain the container fully loaded while the material is passing therethrough, a pair of parallel arranged rockably mounted shafts, supporting means for the container and connected to the shafts, counterbalancing means for the container and associated with one of said shafts, means mounted for rotation and having connection with the shafts to be oscillated thereby, a pointer carried by the rotatably mounted means, and a fixed dial having the pointer associated therewith to indicate the weight of the material passing through the container.

2. A machine for testing the weight of granular material under constant flow, comprising a container for the passage of the material therethrough, a closure for the container to bring about initial filling thereof, means for introducing the material into the container in the same quantity the material is passing therethrough to retain the container fully loaded while the material is passing therethrough, a pair of parallel arranged rockably mounted shafts disposed upon opposite sides of the container, quadrants fixed to the shafts, a platform like supporting means for the container and the latter being mounted therein, flexible means connecting the supporting means to the quadrants, counterbalancing means for the container and connected to one of said shafts, a disk mounted for rotation, means of connection between the shafts and the disk for oscillating the latter, a pointer carried by the disk, and a fixed dial having the pointer associated therewith to indicate the weight of the material passing through the container.

3. A machine for testing the weight of granular material under constant flow, comprising a container for the passage of the material therethrough, a closure for the container to bring about initial filling thereof, means for introducing the material into the container in the same quantity the material is passing therethrough to retain the container fully loaded while the material is passing therethrough, a pair of parallel arranged rockably mounted shafts disposed upon opposite sides of the container, quadrants fixed to the shafts, a platform like supporting means for the container and the latter being mounted therein, flexible means connecting the supporting means to the quadrants, counter-balancing means for the container and connected to one of said shafts, a disk mounted for rotation, means of connection between the shafts and the disk for oscillating the latter, a pointer carried by the disk, a fixed dial having the pointer associated therewith to indicate the weight of the material passing through the container, and damping means for the pointer and associated with the disk.

4. A machine for testing the weight of granular material under constant flow, comprising a container for the passage of the material therethrough, a closure for the container to bring about initial filling thereof, means for introducing the material into the container in the same quantity the material is passed therefrom to retain the container fully loaded while the material is passing therethrough, a pair of parallel arranged rockably mounted shafts disposed upon opposite sides of the container, a platform like supporting means for the container and having an opening with the container mounted therein, means of connection between the container supporting means and the shafts, adjustable counterbalancing means for the container and carried by one of said shafts, quadrants fixed to the shafts and directed toward each other, flexible straps connecting the quadrants to each other for movement in unison, a disk mounted for rotation, means of connection between the disk and one of said quadrants for oscillating the disk, a pointer carried by the disk, a fixed dial having the pointer associated therewith to indicate the weight of the material passing through the container, and braking means selectively effective upon one of said shafts.

5. A machine for testing the weight of granular material under constant flow, comprising a container for the passage of the material therethrough, a closure for the container to bring about initial filling thereof, means for introducing the material into the container in the same quantity the material is passed therefrom to retain the container fully loaded while the material is passing therethrough, a platform supporting the container, a pair of parallel arranged rockably mounted shafts, quadrants fixed to each of the shafts, flexible metallic straps connected to the quadrants and the platform, adjustable counter-balancing means for the container and carried by one of said shafts, frame like quadrants fixed to the shafts and being directed toward each other for the disposal of the arcuate portions in close proximity, means connecting the arcuate portions to each other for movement of the frame like quadrants in unison, a stub shaft mounted for rotation, a hub like member fixed to one end of the stub shaft, counterbalancing means connected to the hub like member, flexible means connecting the hub like member to one of said arcuate portions, a disk fixed to the opposite end of the stub shaft, a pointer carried by the disk, and a dial having the pointer associated therewith to indicate the weight of the material passing through the container.

6. A machine for testing the weight of granular material under constant flow, comprising a container for the passage of the material therethrough, a closure for the container to bring about initial filling thereof, means for introducing the material into the container in the same quantity the material is passed therefrom to retain the container fully loaded while the material is passing therethrough, a platform supporting the container, a pair of parallel arranged rockably mounted shafts, quadrants fixed to each of the shafts, flexible metallic straps connected to the quadrants and the platform, adjustable counterbalancing means for the container and carried by one of said shafts, frame like quadrants fixed to the shafts and being directed toward each other for the disposal of the arcuate portions in close proximity, means connecting the arcuate portions to each other for movement of the frame like quadrants in unison, a stub shaft mounted for rotation, a hub like member fixed to one end of the stub shaft, counterbalancing means connected to the hub like member, flexible means connecting the hub like member to one of said arcuate portions, a disk fixed to the opposite end of the stub shaft, a pointer carried by the disk, a dial having the pointer associated therewith to indicate the weight of the material passing through the container, leveling means for the machine, and a housing for the machine.

7. A machine for testing the weight of granular material under constant flow, comprising a container for the passage of the material therethrough, means for introducing the material into the container in the same quantity as the material passing therethrough to retain the container fully loaded, a pair of parallel arranged rockably mounted shafts disposed upon opposite sides of the container, quadrants fixed to the shafts, a platform-like supporting means for the container and the latter being mounted therein, flexible means connecting the supporting means to the quadrants, counter-balancing means for the container and connected to one of said shafts, a disc mounted for rotation, means of connection between the shafts and the disc for oscillating the latter, a pointer carried by the disc, and a fixed dial having the pointer associated therewith to indicate the weight of the material passing through the container.

FREDERICK F. LEWIS.